March 25, 1941.　　R. N. FRIEND　　2,236,093
SURFACE SCRAPER
Filed April 27, 1939　　2 Sheets-Sheet 1

INVENTOR.
Richard N. Friend
BY
Sam J. Slotchy
ATTORNEY.

March 25, 1941.     R. N. FRIEND     2,236,093
SURFACE SCRAPER
Filed April 27, 1939     2 Sheets-Sheet 2

INVENTOR.
Richard N. Friend
BY Sam J. Slotsky
ATTORNEY.

Patented Mar. 25, 1941

2,236,093

UNITED STATES PATENT OFFICE 2,236,093

SURFACE SCRAPER

Richard N. Friend, Sioux City, Iowa

Application April 27, 1939, Serial No. 270,387

4 Claims. (Cl. 30—172)

My invention relates to a device for scraping surfaces.

An object of my invention is to provide a device which is adaptable for use on certain types of surfaces, and especially roofing.

A further object of my invention is to provide a scraper which will scrape gravel from roofing in an efficient manner.

A further and important object of my invention is to provide a scraper which during the scraping operation of certain of the blades, will automatically resharpen the other blades.

A further object of my invention is to provide a scraper which is easily manipulated and can be operated either by hand, or power operated.

A further object of my invention is to provide an arrangement wherein new blades can be inserted as desired.

A further object of my invention is to provide a device of simplicity which can be manufactured at a reasonable cost.

Figure 1:
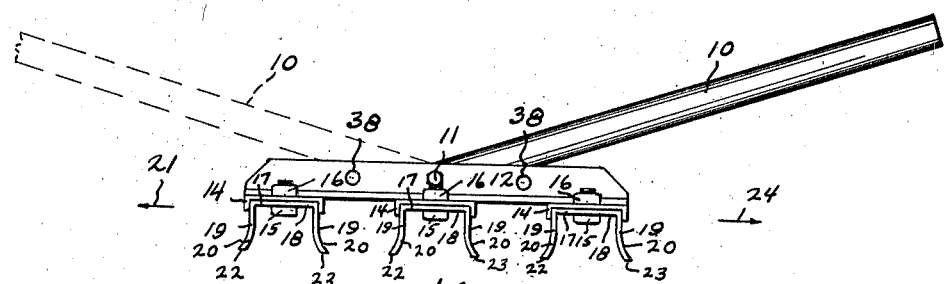
Figure 2:
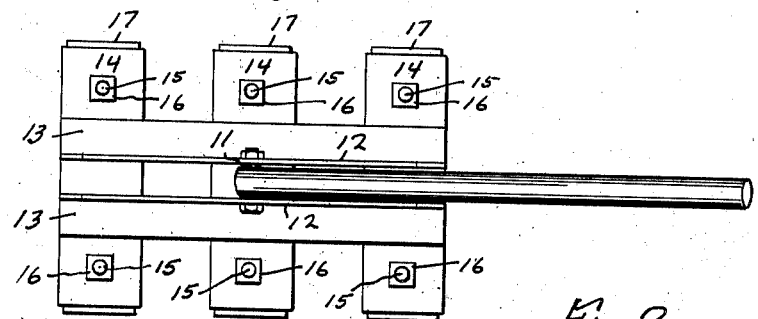
Figure 3:
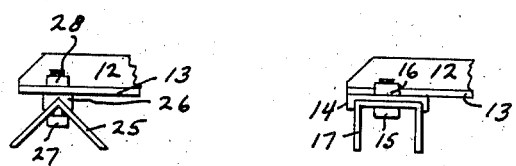
Figure 4:
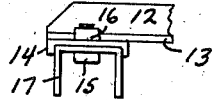
Figure 7:
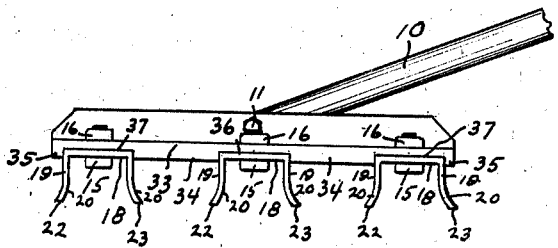
Figure 5:
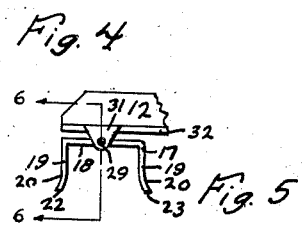
Figure 6:
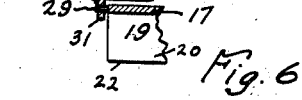
Figure 8:
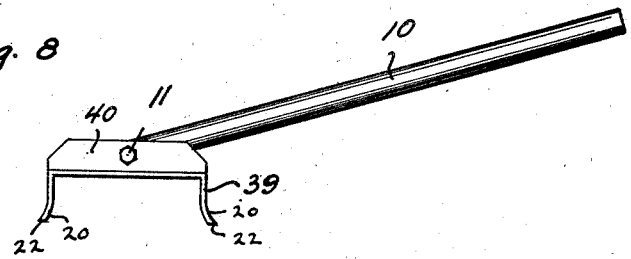
Figure 9:
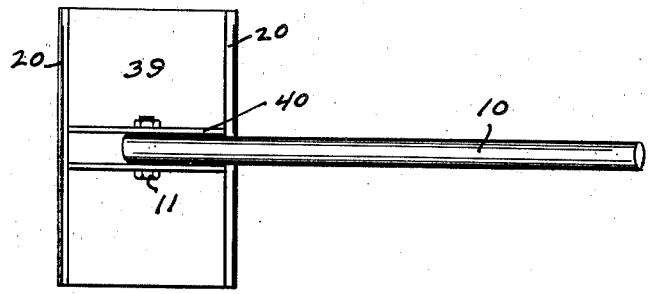
Figure 10:
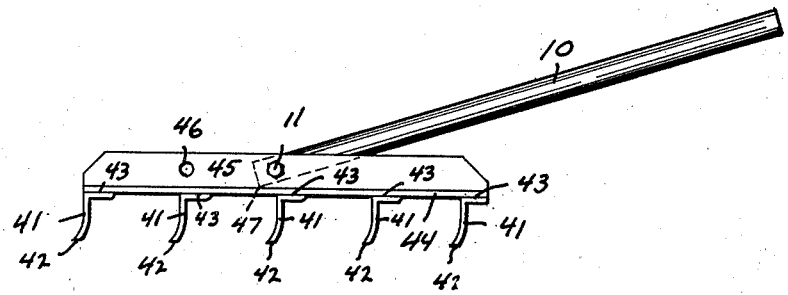

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of the scraper,
Figure 2 is a plan view of the same,
Figure 3 is a detail of a slight modification,
Figure 4 is a further detailed modification,
Figure 5 is a further modification,
Figure 6 is a view of Figure 5 taken along the lines 6—6 thereof,
Figure 7 is a modified form of a holding plate,
Figure 8 is a further modification,
Figure 9 is a plan view of Figure 8, and
Figure 10 is a further modification.

I have used the character 10 to designate the handle of my scraper which is pivoted by means of a bolt 11, which bolt is received substantially at the mid-point between the two flanges 12 which are integral portions of the angle members 13. Attached transversely across the members 13 are the receiving channels 14 which are suitably welded thereto or attached in any suitable manner. Attached within the chanel members 14 by means of the bolts and nuts 15 and 16 are the scraping members 17. The scraping members 17 include the base portions 18, the downwardly extending vertical portions 19 and the arcuate portions 20. The scraping members are thus formed in a substantial channel shape with the exception of the arcuate portions 20. These arcuate portions, however, are important since they assist in the sharpening action to be described.

In use, the handle 10 is grasped and the unit is thrust in the direction of the arrow 21 with the lower edges 22 of the scraping members thereby being applied transversely against the gravel or other surface. By virtue of the edges thus formed, the gravel or such surface is efficiently removed. Since the thrust is imparted against the forward edges or those edges in the direction of motion, the reverse edges such as 23 which are curved away from the direction of motion will be automatically sharpened.

The handle can then be swung to the dotted position as shown in Figure 1 and the device is forced in the direction of the arrow 24 with the sharpened edges thereby being in position for operation, and in this instance, the edges 22 will be resharpened. The operation can be performed with several successive movements of the unit before reversing but by virtue of the aforesaid arrangement, the edges are thereby automatically resharpened. If desired, any power arrangement can be attached to the handle 10 for driving the same.

A modified form of the device is shown in Figure 3 wherein instead of transverse channel members 17, angle members 25 can be used which are attached within suitable keepers 26 which are attached to a similar arrangement as shown in Figures 1 and 2 by means of bolts and nuts 27 and 28.

Figure 4 shows a further modification wherein a straight channel can be employed without the curved edges. Figure 5 illustrates a modification wherein the same principles are employed with the exception that the channel members 17 include extending pins 29 which are received within suitable openings 30 in downwardly projecting ears 31 which are attached to suitable transverse plates 32. In this form of device, the members 17 will rock or pivot on the pin 29 which will thereby provide a pivoting action to the cutting edges thereby providing a positive action in the direction of thrust and in many cases a more efficient action.

Figure 7 shows a further modification wherein the same construction is employed as in Figures 1 and 2 with the exception, however, that a plate member 33 which is attached to the angle members 13 is employed. This plate member extends laterally the entire length of the member 17 and includes the downwardly extending portions 34 and 35 leaving openings at 36 and 37 for the reception of similar members 17.

In referring back to Figure 1 it will be noted that there are two pairs of spaced openings 38 which are located in the side members 12. The reason for these openings is to provide means for attaching the bolt 11 in either of the openings 38 so that pressure can be applied more directly in the direction of movement. For instance, as shown in Figure 1, the handle 10 can be pivoted upon the bolt 11 in the left hand pair of openings 38 which after several scraping motions of the device the pivoting point can be changed to the right hand openings although this is not always essential and the arrangement can be pivoted centrally as shown.

In referring to Figure 7, it is not always essential to use the spacers 34 and 35 and if desired, flat plates can be employed. Figure 8 shows a modification wherein the same principle is employed with the exception, however, that a single unit wherein a single scraping channel 39 which can be wider than those heretofore described is used. The same attached arrangements, however, such as the handle can be employed and the handle can be pivoted suitably within a forwardly extending channel member 40 and the scraping members 39 are welded thereto (see Figure 9).

Figure 10 shows a modification wherein instead of rearwardly located members only single members are employed such as 41 having forward cutting edges 42. The members 41 are attached at 43 by welding or in any other suitable means to a plate member 44 which is attached to a suitable channel such as 45 which incldes an opening 46 which can serve the same purpose as the openings 38 heretofore described.

The handle 10 in this form of structure can abut at 47 against the plate 44 to limit upward movement. In this form of device the scraping action will be applied forwardly only, without reversal. If desired, the members 41 can be attached by means of suitable bolts if it is desired to form a unit with replaceable cutting blades.

It will now be seen that I have provided a surface scraper, especially adaptable for use as a roofing scraper, which will efficiently scrape gravel and similar substances, which includes means for automatically resharpening blades of the device, which is efficient in operation and which can be manufactured at a reasonable cost.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A surface scraper comprising a plurality of spaced transverse channels, means for forcing the lower edges of said channels against surfaces to be scraped, said channels including substantially arcuate and outwardly bent lower side edges to provide sharpening action against rear edges when forward edges are applied against scraped surfaces.

2. A surface scraper comprising a plurality of spaced transverse channels, means for forcing the lower edges of said channels against surfaces to be scraped, said channels including substantially arcuate and outwardly bent lower side edges to provide sharpening action against rear edges when forward edges are applied against scraped surfaces, a plurality of retaining channels receiving and attached to said scraping channels.

3. A surface scraper comprising a plurality of spaced transverse channels, means for forcing the lower edges of said channels against surfaces to be scraped, said channels including substantially arcuate and outwardly bent lower side edges to provide sharpening action against rear edges when forward edges are applied against scraped surfaces, a plurality of retaining channels receiving and attached to said scraping channels, a pair of forwardly extending flanges attached to said receiving channels, a handle pivoted between said flanges.

4. A surface scraper comprising a plurality of spaced transverse channels, means for forcing the lower edges of said channels against surfaces to be scraped, said channels including substantially arcuate and outwardly bent lower side edges to provide sharpening action against rear edges when forward edges are applied against scraped surfaces, a holding plate, means for pivoting said channels to said plate to cause rocking action thereto.

RICHARD N. FRIEND.